Jan. 7, 1958  J. R. BAILEY  2,818,896
BENCH SAW LATHE ATTACHMENT
Filed Sept. 10, 1954  3 Sheets-Sheet 1
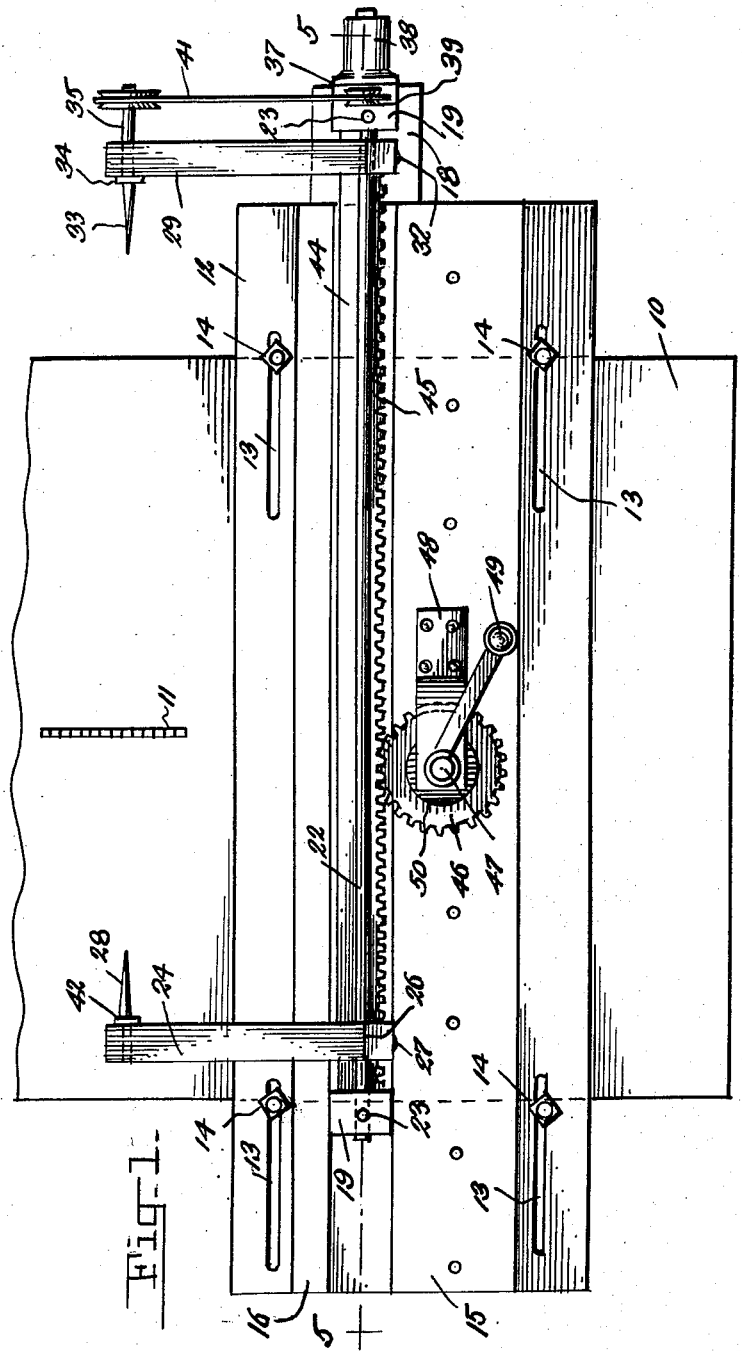
INVENTOR.
JOHN R. BAILEY
BY
Patrick D Beaver
ATTORNEY

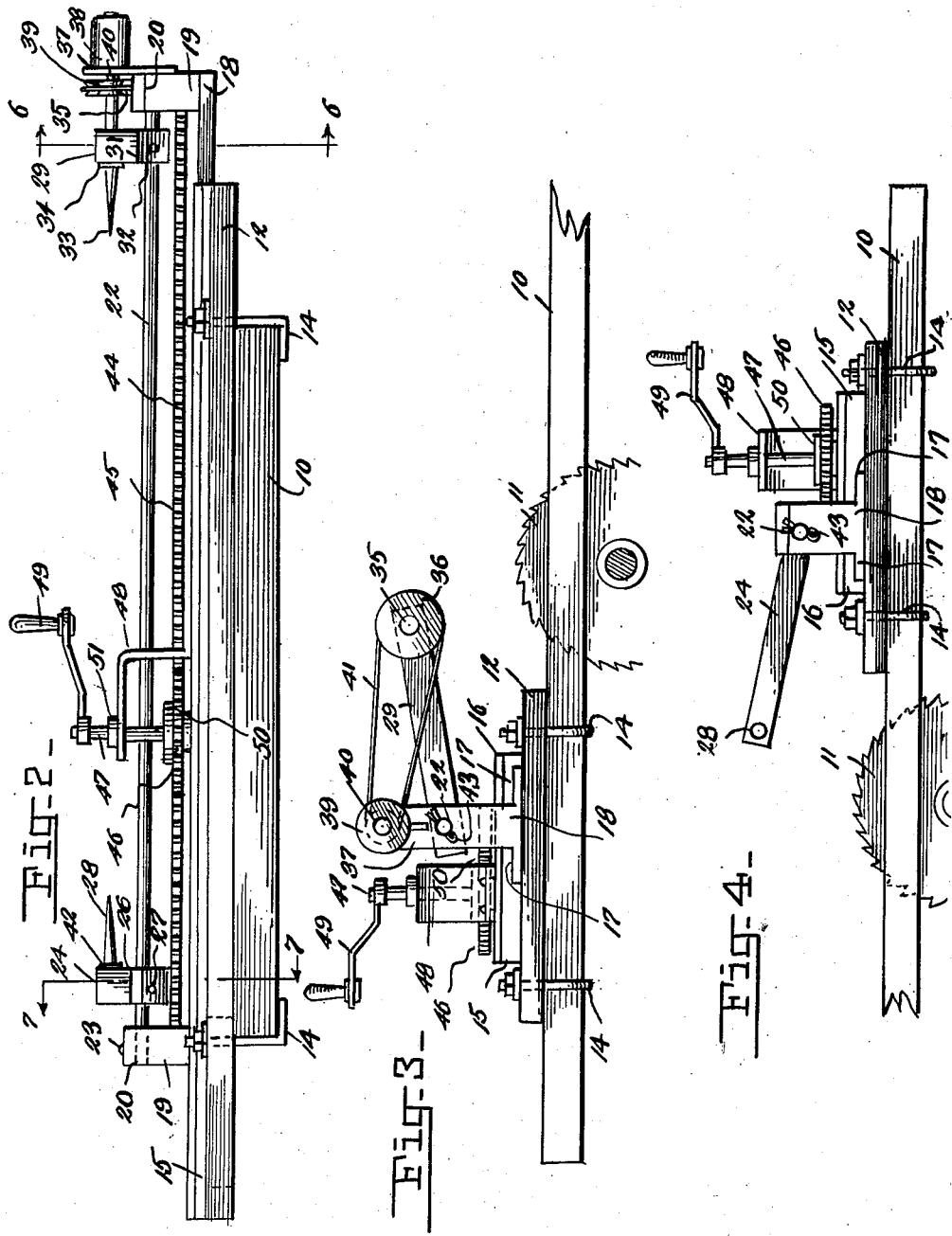

Jan. 7, 1958 J. R. BAILEY 2,818,896
BENCH SAW LATHE ATTACHMENT
Filed Sept. 10, 1954 3 Sheets-Sheet 3
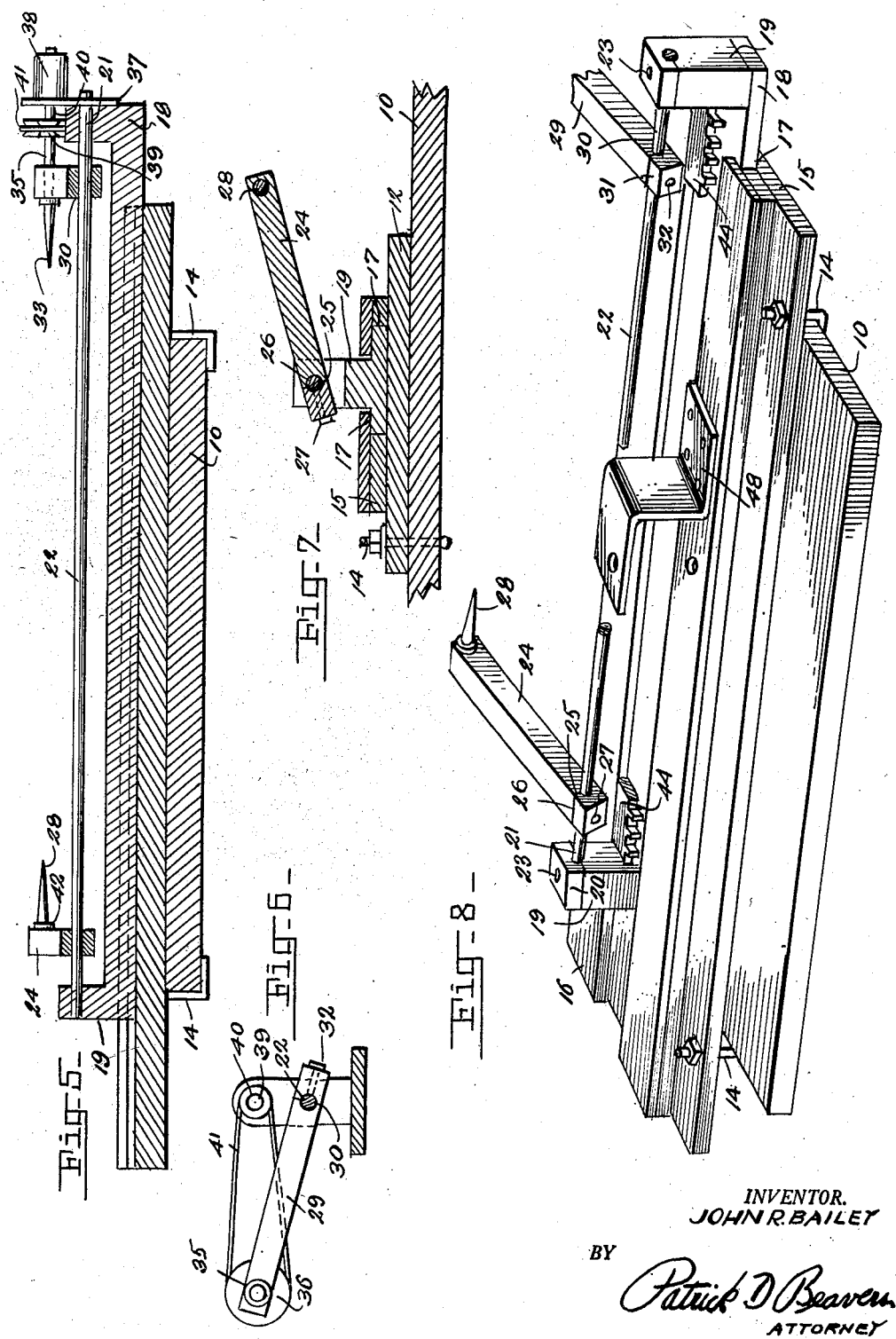
INVENTOR.
JOHN R. BAILEY
BY
Patrick D. Beaver
ATTORNEY

United States Patent Office 2,818,896
Patented Jan. 7, 1958

2,818,896

BENCH SAW LATHE ATTACHMENT

John R. Bailey, Asheville, N. C., assignor of one half to Lydia A. Shock, Asheville, N. C.

Application September 10, 1954, Serial No. 455,276

2 Claims. (Cl. 144—205)

This invention relates to improvements in a bench saw lathe attachment for a bench saw.

An important object of the invention is to provide an attachment that will permit the cutting of any type of round stock, such as is used for table legs, lamp stands, bed and chair posts etc.

Another object of the invention is to provide an attachment that can cut a thread effect in a piece of wood.

The attachment is of such construction and capable of such adjustment that many and various designs can be cut on a piece of wood or from a piece of wood.

With the above and other objects and advantages in view, the invention consists of the novel details of construction, arrangement and combination of parts more fully hereinafter described, claimed and illustrated in the accompanying drawings in which:

Fig. 1 is a top plan view of the attachment embodying the invention in position on the saw table of a bench saw;

Fig. 2 is a side elevational view of the attachment;

Fig. 3 is an end elevational view of the attachment;

Fig. 4 is an end elevational view of the end opposite to the end shown in Fig. 3;

Fig. 5 is a longitudinal sectional view on the line 5—5 of Fig. 1;

Fig. 6 is a transverse sectional view on the line 6—6 of Fig. 2;

Fig. 7 is a transverse sectional view on the line 7—7 of Fig. 2; and

Fig. 8 is a perspective view of the attachment.

Referring more in detail to the drawings wherein like parts are designated by like reference numerals the numeral 10 is used to designate a saw table of a bench saw which is of conventional design and is provided with the usual rotary saw blade 11.

The bench saw forms no part of the invention except wherein the saw blade 11 coacts with the attachment for carrying out the various functions of the present invention.

The attachment embodying the invention comprises a rectangularly shaped base plate 12 which is provided adjacent each corner thereof with an elongated slot 13 which is parallel to the longitudinal side edges of the base plate 12. L-shaped bolts 14 extending through the slots securely fasten the base plate 12 to the table 10, as shown in Fig. 2.

Mounted on the base plate 12 longitudinally thereof in parallel spaced relation to each other are a pair of guide rails 15 and 16. Viewing Figure 7, it will be seen that each guide rail is provided on the inner longitudinal edge thereof with a trackway 17. The trackways 17 are in parallel relation to each other and receive a carriage bed 18 for reciprocal sliding movement therein.

An upright 19 is formed integrally with each end of the carriage bed 18, as shown in Figure 5.

The upper side edge of each upright 19 is provided with a slot 20 which communicates with a bore 21 and a longitudinally extended rod 22 has its opposite ends receivable in the bore 21. When a fastener 23 is tightened the slots 20 permit compression of the upper ends of the uprights 19 to securely fasten the rod 22 in the bores 21, as shown in Figure 8.

An arm 24 is provided with a bore 25 at one end and a slot 26 communicating with the bore 25 will permit compression of the end of the arm 24 on the rod 22 when a fastener 27 is tightened. When the fastener 27 is loosened the arm 24 may be reciprocated longitudinally on the rod 22. A spindle 28 is mounted in the opposite end of the arm 24 for a purpose to be later described.

Another arm 29 is provided with a bore 30 at one end and a slot 31 communicating with the bore 30 will permit compression of the end of the arm 29 on the rod 22 when a fastener 32 is tightened. A left-handed screw threaded spindle 33 is mounted in the opposite end of the arm 29 and material to be worked on is threaded on the spindle 33 until it engages a circular shoulder 34 on the spindle adjacent the arm 29. The opposite end 35 of the spindle 33 extends outwardly of the arm 29 and has a small V-pulley 36 mounted thereon.

A bracket 37 is clamped around shaft 22 in contact with the upright 19 adjacent the arm 29 and a small electric motor 38 is mounted on the bracket 37, as shown in Fig. 5. The bracket 37 eliminates any slack in a V-belt 41 when a template is being used. A V-pulley 39 is mounted on a drive shaft 40 of the electric motor 38 and a belt drive connection 41 is mounted on the V-pulleys 36 and 39, respectively. The pulley 39 is smaller than the pulley 36 on the spindle 33 so that the speed of rotation of the spindle 33 is reduced since the spindle 33 does not have to be rotated at a very fast rate of speed.

Both spindles are mounted in roller bearings in the respective arms and an adjustable collar 42 is provided on the spindle 28 for taking up any slack that may develop while the material mounted between the respective spindles is being rotated. Cotter pins 43 are provided in the outer ends of the rod 22 to prevent the rod from moving laterally within the uprights 19, one end of the rod extending outwardly of the bracket 37, as shown in Fig. 3.

Mounted on the carriage bed 18 longitudinally thereof is a plate 44 which is provided on one longitudinal edge thereof with gear teeth 45. The teeth 45 mesh with a rotary gear 46 mounted on a vertical shaft 47. A bracket 48 fixed to the guide rail 15 journals the shaft 47 in vertical relation to the surface of the guide rail 15. A crank handle 49 on the upper end of the shaft 47 provides means for rotating the gear 46 which, meshing with the teeth 45 on the plate 44, causes reciprocation of the carriage bed 18.

A collar 50 on the shaft 47 retains the rotary gear 46 in alinement with the teeth 45 on the plate 44 and a collar 51 on the shaft 47 engaging the upper surface of the bracket 48 maintains the shaft 47 in true vertical alinement with the guide rail 15.

The slots 13 in the base plate 12 and the bolts 14 permit the base plate 12 to be mounted in angular relation to the saw table 10.

When the base plate 12 is turned at a 90 degree angle to the saw blade 11, the blade 11 will cut a perfect circle around a piece of wood that is centered between the two spindles. Each time the wood is rotated, if the wood is moved over or into the saw blade, it will make a perfect round, the length of the piece of wood, and if the spindles are off center, it will cut a round taper such as a plug baseball bat, etc. The shape can also be affected by raising or lowering the saw blade to the size desired.

When the attachment is turned at another angle than 90 degrees to the saw table 10, a threaded design is cut on the wood, the fineness or coarseness is determined by the degree that the attachment is turned to the saw blade 11. Each degree cuts a different design. Also the direction that the attachment is turned in relation to the saw blade 11 determines whether the threaded design is right or left hand. It will be apparent that this angular disposition of the attachment with respect to the table 10 is accomplished by selectively positioning the clamps 14 in the slots 13 to permit a variety of positions of the base plate 12 with respect to the table 10.

In this process the wood is rotated slowly and fed into the saw blade 11 at the speed suitable to the fineness or coarseness of the threaded design on the wood.

A fluted or concave design can also be cut with the attachment the width and depth also determined by the degree the attachment is turned in relation to the saw blade. The wood is not rotated in this process.

The small electric motor 38 is all that is required to rotate the wood in the attachment.

Smoothing the work is done by rotating the work and holding sandpaper or other abrasive on the wood until the desired smoothness is obtained, or by putting an abrasive blade on the saw instead of the regular saw blade.

The cutting blade used on the bench saw can be any of the various blades already in use or if some special design is wanted in great quantity, a shaper head blade may be ground for the purpose. Shaper head blades are the faster cutting blades if ground correctly.

This is some of the work that can be accomplished by the attachment and there are other designs that are possible by changing the spindles to ones suitable for metal or applying a chuck on the spindles and using carbon tipped saw blades or abrasive stones on the bench saw, metals can be turned as well as wood.

If arms 24 and 29 are the same height from the cutting blade, any shape desired may be cut by raising the cutting blade 11, or lowering the cutting blade 11 on the saw mandrel, or if a design is wanted on a taper, you raise the arm 24 to the desired taper, and then proceed to cut the design, by raising or lowering the cutting blade.

The template needed is the design desired cut out on a flat piece of material and clamped to the saw table directly under a pin the length of the material so the pin can follow it perfectly. The work is done with the material being rotated between arms 24 and 29 at all times, when round work is being done.

If the material is not rotated it will cut a flute or concave the shape of the cutting tool being used.

The fluted or concave design is wanted sometimes, and can be worked out on this attachment by turning the attachment to the angle that will cut the depth and width desired.

By turning the attachment at various angles, many designs can be cut on a piece of wood, depending upon the skill of the workman using it.

Threads of any size and depth may be cut or any thread affect on a piece of wood. The angle the attachment is turned to with respect to the cutting tool determines the number of threads cut, and the speed the material is rotated, and fed into the cutting tool is important as in cutting a threaded affect, or twisted affect, the material is rotated slowly and fed slowly, both at the same time. In feeding the cutting tool the hand crank 49 is rotated and the carriage bed is slid between the guide rails, the rotating of the hand crank 49 is the feeding process for any material being used.

Various methods of operation of the attachment have been set forth and it is believed that further operations of the attachment will be apparent to those skilled in the art.

It is also to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

1. A lathe attachment for a bench saw table comprising a base plate, means for securing the base plate on said table in angular relation to the longitudinal axis of said table, guide means on said base plate, a carriage bed mounted on said base plate intermediate of said guide rails, uprights mounted on the ends of said carriage bed, a rod interconnecting said uprights longitudinally of said carriage bed, arms mounted on said rod, means on the outer ends of said arms for mounting a piece of material between said arms for operation thereon by the bench saw, means for rotating said last named means and means for causing the reciprocation of said carriage bed.

2. A device as defined in claim 1 wherein said first-named means comprises a longitudinal slot formed in each corner portion of said face plate, an L-shaped bolt extending vertically through each slot, and a nut at the upper end of each bolt, the lower portions of said bolts adapted to clamp against the underside of said table.

References Cited in the file of this patent

UNITED STATES PATENTS

| | | |
|---|---|---|
| Re. 7,262 | Hull | Aug. 15, 1876 |
| 164,897 | Wood | June 22, 1875 |
| 616,597 | Wright | Dec. 27, 1898 |
| 731,087 | Tucker | June 16, 1903 |
| 1,484,286 | Alber | Feb. 19, 1924 |
| 2,715,924 | Norris | Aug. 23, 1955 |